Figure 1:
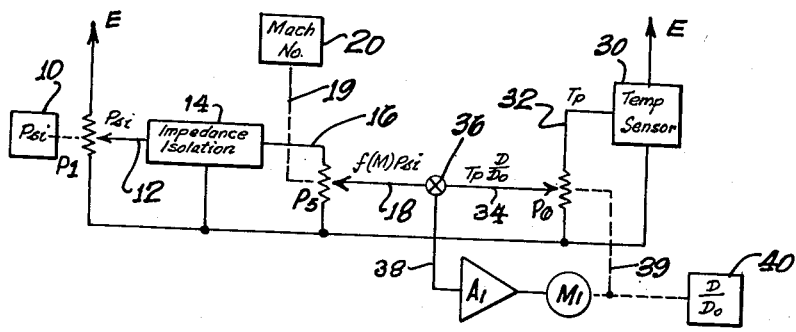

Dec. 22, 1964

A. W. CONOW ETAL 3,162,043

COMPENSATED AIR DENSITY COMPUTER

Filed Aug. 12, 1960

ARTHUR W. CONOW,
ROBERT CHARLES HOWARD,
INVENTORS.

BY
Barkelew & Lewis

United States Patent Office 3,162,043
Patented Dec. 22, 1964

3,162,043
COMPENSATED AIR DENSITY COMPUTER
Arthur W. Conow, La Mirada, and Robert Charles Howard, Costa Mesa, Calif., assignors to Giannini Controls Corporation, Duarte, Calif., a corporation of New York
Filed Aug. 12, 1960, Ser. No. 49,182
3 Claims. (Cl. 73—178)

This invention is concerned with mechanism for computing the true relative density of the atmosphere surrounding an aircraft or other moving vehicle.

True air density D is related to static pressure $P_s$ and true air temperature T by the relation:

$$\frac{D}{D_0}=\frac{P_s}{P_{s0}}\cdot\frac{T_0}{T} \tag{1}$$

where the subscript $_0$ denotes the value of the indicated quantity under standard conditions of temperature and pressure.

However, it is not possible in a rapidly moving vehicle to measure true static pressure and true air temperature directly. The indicated static pressure $P_{si}$ obtained from a conventional static pressure orifice, and the bulb temperature $T_p$ obtained from a conventional temperature probe both involve deviations which vary with the Mach number of the vehicle.

A primary general object of the present invention is to provide particularly simple, reliable and economical mechanism for compensating the described deviations and providing a substantially accurate indication of the true air density.

A more particular object of the invention is to provide a computation system in which corrections for bulb temperature and for indicated static pressure are introduced by a single servo loop, thereby greatly reducing the total number of components required in the system.

The invention further provides particularly effective means for sensing bulb temperature. Conventional temperature responsive resistive elements that have a positive temperature coefficient depart significantly from linearity of response. We have discovered that it is possible to connect two such elements in a passive network in such a way that the output is not only substantially linear but also varies with temperature more rapidly than has previously been possible without the use of active elements.

A full understanding of the invention and of its further objects and advantages will be had from the following description of an illustrative preferred manner of carrying it out. The particulars of that description, and of the drawings which form a part of it, are intended only as illustration, and not as a limitation upon the scope of the invention, which is defined in the appended claims.

Figure 2:
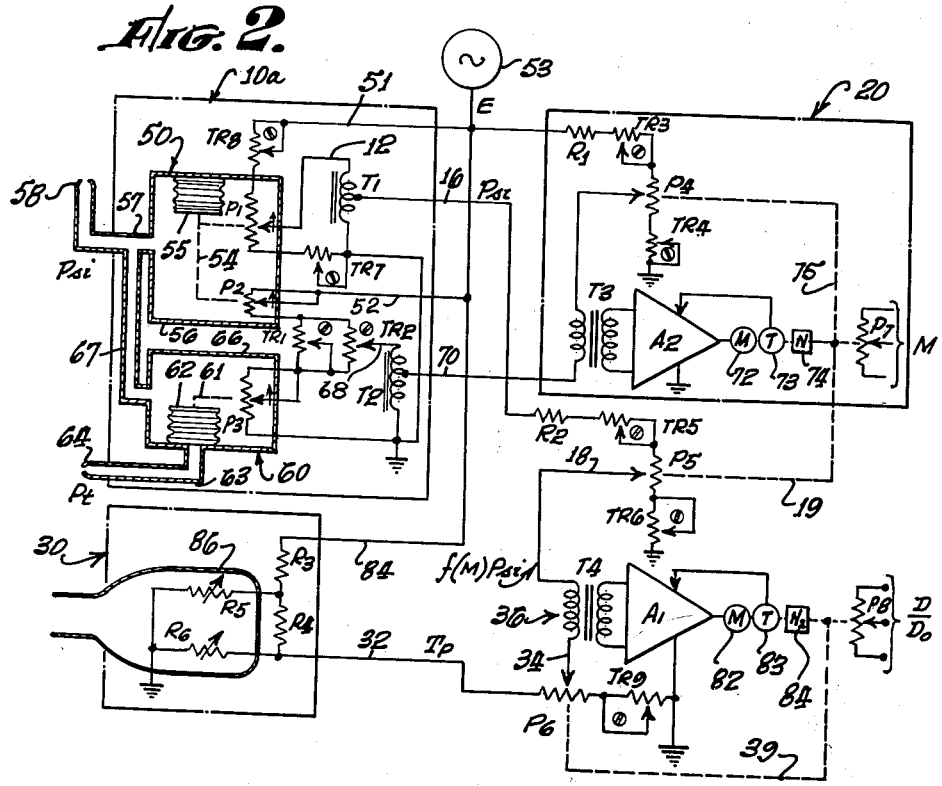

In the drawings:

FIG. 1 is a schematic block diagram representing an illustrative system in accordance with the invention; and FIG. 2 is a schematic diagram showing further details of the illustrative system of FIG. 1.

In the block diagram of FIG. 1, the potentiometer P1 is supplied with a suitable reference voltage E. The potentiometer wiper is driven by mechanism indicated schematically at 10 in response to indicated state pressure. The output on line 12 is then proportional to $P_{si}$. After suitable impedance reduction at 14, the corresponding signal on line 16 is multiplied by a correction factor $f(M)$, which is a definite function of Mach number M. As represented, the signal on line 16 is supplied as reference voltage to the potentiometer P5, the potentiometer wiper being driven in accordance with Mach number via a suitable linkage indicated schematically at 19. That drive may utilize a Mach number computer 20 such as is ordinarily required also for other purposes in an air data computing system. The winding of potentiometer P5 is typically shaped in a known manner to provide the desired function $f(M)$, to be described. The voltage tapped from potentiometer P5 on the line 18 then represents the quantity $f(M)P_{si}$.

A voltage representing bulb temperature, which includes the deviation due to ram temperature rise, is developed on the line 32 by mechanism represented schematically at 30. That mechanism may be of conventional type, but preferably comprises the improved multiple unit temperature probe to be described. The voltage on line 32 is supplied as reference voltage to the servo-driven balance potentiometer P6. The voltage tapped from P6 on the line 34 is compared with that on line 18, already described, by the differential device indicated schematically at 36. The resulting difference voltage, if any, is supplied via the line 38 to the servo amplifier A1. The amplifier output controls the servo motor M1, driving potentiometer P6 via the linkage indicated at 39 in such a way as to maintain the difference voltage on line 38 substantially equal to zero. The resulting balance condition of the servo system can be expressed by the equation $$XT_p=P_{si}f(M) \tag{2}$$

where X represents the transfer function of potentiometer P6.

In accordance with one aspect of the present invention, the single function $f(M)$, introduced by the correction potentiometer P5, incorporates both the required correction for converting indicated static pressure $P_{si}$ to true static pressure $P_s$, and the correction for converting the indicated or bulb temperature $T_p$ to true air temperature T. The entire computation of compensated air density may therefore be carried out with only a single servo loop.

For that purpose, potentiometer P5 is so constructed and driven from Mach computer 20 that the correction function $f(M)$ is of the form $$f(M)=\frac{T_0}{P_{s0}}\cdot\frac{f_p(M)}{f_t(M)} \tag{3}$$

where the ratio $T_0/P_{s0}$ is a constant; $f_p(M)$ is the ratio of true static pressure to indicated static pressure; and $f_t(M)$ is the ratio of the true air temperature to indicated or bulb temperature. Temperature correction ratio $f_t(M)$ can be expressed in the form $$f_t(M)=\frac{1}{1+0.2rM^2} \tag{4}$$

where $r$ is the recovery factor of the temperature bulb, which is typically equal to 0.85 for a conventional flush mounted temperature bulb. Since $r$ is essentially constant, $f_t(M)$ is a function of Mach number only, as indicated by the notation.

Pressure correction ratio $f_p(M)$ represents the error commonly known as the static pressure defect or static source position error. For common static systems the static defect is known to be a function of Mach number only, and can readily be determined experimentally by known procedures. Over the range of Mach numbers typically encountered in subsonic flight the total variation of $f_p(M)$ is approximately 10%. Potentiometer P5 can therefore readily be shaped by known methods to provide the required overall function defined in (3).

With correction potentiometer P5 designed and driven in the described manner, Equation 2 may be rewritten as follows:

$$X=\frac{T_0}{P_{s0}}\cdot\frac{P_{si}f_p(M)}{T_pf_t(M)}=\frac{P_s}{P_{s0}}\cdot\frac{T_0}{T} \tag{5}$$

Comparing Equations 1 and 5, the transfer function X of balance potentiometer P6 is seen to correspond to the density ratio $D/D_0$. An output device of any suitable type can therefore be coupled to the servo drive 39, as represented at 40 in FIG. 2, to provide a signal of desired type representing D.

FIG. 2 represents an illustrative practical system for carrying out the invention, wherein generally corresponding parts are numbered as in FIG. 1. Although the particulars of Mach number computer indicated at 20 in FIG. 1 are not, in themselves, a part of the present invention, such a computer is included in illustrative form in FIG. 2 for clarity of description of the overall concept. Pressure responsive elements for controlling Mach computer 20 are incorporated with static pressure transducer 10 of FIG. 1 in the transducer assembly 10a of FIG. 2.

As shown illustratively in FIG. 2, transducer assembly 10a comprises the static pressure transducer 50 and the differential pressure transducer 60. Transducer 50 comprises two electrically independent potentiometers P1 and P2, which are supplied with an alternating current reference voltage E via the lines 51 and 52, respectively, from a suitable source indicated schematically at 53. The potentiometer wipers are driven via suitable coupling means 54 by the evacuated capsule 55. The exterior of capsule 55 is exposed to indicated static pressure supplied to the interior of the housing 56 via the conduit 57 from the static orifice 58. That pressure $P_{si}$ differs from the true static pressure $P_s$ by a definite static defect factor, which, as already explained, is a function of Mach number. The output line from potentiometer P1 thus carries a voltage proportional to $P_{si}$, and corresponds to line 12 of FIG. 1. Trimming resistors TR7 and TR8 are preferably connected in series with the winding of P1 to facilitate adjustment of the system and promote interchangeability of the components.

Differential pressure transducer 60 comprises a potentiometer P3, driven via the linkage 61 by a pressure capsule 62. Capsule 62 is driven in any suitable manner in response to the difference between total pressure $P_t$ and indicated static pressure $P_{si}$. For example, in the structure shown, the interior of capsule 62 is supplied with ram or total pressure $P_t$ via the conduit 63 from a suitable total pressure orifice indicated at 64. The exterior of capsule 62 is exposed to indicated static pressure $P_{si}$, supplied to the interior of the housing 66 from orifice 58 via conduits 57 and 67. The wiper of potentiometer P3 is therefore moved in proportion to the indicated differential pressure $q_{ci}=P_t-P_{si}$.

For Mach number computation potentiometers P2 and P3 are connected as rheostats in series between reference voltage line 52 and ground. The trimming resistor TR1 and the trimming potentiometer TR2 are connected in parallel between P2 and P3. The voltage tapped from TR2 on the line 68 is a function of the pressure ratio $$\frac{q_{ci}}{q_{ci}+P_{si}/K}$$

where K is the ratio of the resistance per unit pressure in potentiometer P3 to that in P2. With suitable selection of K, the pressure ratio (6) can be shown to provide a nearly linear measure of Mach number M over any Mach range that is ordinarily required. The small static defect errors in $q_{ci}$ and $P_{si}$ are compensated by shaping potentiometer P4, to be described. Particularly when a cable of appreciable length is required between pressure transducer unit 10a and other portions of the system, it is desirable to provide impedance isolation for the outputs from lines 12 and 68, as indicated at 14 for line 12 in FIG. 1. The autotransformers T1 and T2 in FIG. 2 typically provide approximately 10:1 voltage reduction, or 100:1 impedance reduction. The source impedance as viewed by the capacity of output lines 16 and 70 in a shielded cable is thereby reduced to an essentially negligible value, even for a cable as long as 200 feet, for example.

The voltage on line 70, representing pressure ratio (6), is compared by the summing transformer T3 to the voltage developed at the wiper of the balance potentiometer P4 in Mach computer 20. The winding of P4 is supplied with reference voltage from source 53 via the voltage dropping resistor R1, and is provided with series connected trimmers TR3 and TR4 which adjust the end points. The error voltage, as derived from the secondary of summing transformer T3 is supplied as input to servo amplifier A2. The amplifier output controls the servo-motor 72 and feedback tachometer 73, driving the wiper of balance potentiometer P4 via the gear reduction 74 and the linkage 75. The winding of P4 is suitably shaped to compensate the slight lack of linearity between the signal on line 70, representing pressure ratio (6), and the corresponding Mach number M. The movement of drive 75 thus represents M directly, and may be arranged to drive any desired type of Mach number output device, such as the output potentiometer P7, for example. The servo drive 75 is coupled via linkage 19 to the wiper of potentiometer P5 of the air density computer, and drives it in accordance with Mach number, as already described in connection with FIG. 1.

Turning now more specifically to the air density computation circuit as shown in FIG. 2, the signal on line 16 representing $P_{si}$ is supplied via dropping resistor R2 to the winding of potentiometer P5, which is preferably provided with appropriate end set trimming resistors TR5 and TR6. The winding of potentiometer P5 is shaped to the correction function $f(M)$, already described. The voltage developed on line 18 by the wiper P5, driven in accordance with Mach number, is proportional to the product of $P_{si}$ and that correction function. That voltage is supplied to one end of the primary of summing transformer T4, which corresponds to differential device 36 of FIG. 1.

The other end of the primary of transformer T4 receives on line 34 the voltage tapped from servo balance potentiometer P6. The winding of P6 is provided with the trimming resistor TR9, and is supplied via line 32 with a voltage representing bulb temperature, as already described. The error voltage developed by the secondary of T4 is supplied as input to servo amplifier A1. The servo loop typically includes the motor 82, tachometer 83 and gear reduction 84, and drives the wiper of P6 via linkage 39. As already explained, the wiper movement corresponds directly to the true air density ratio $D/D_0$. Hence any desired linear output device, such as the output potentiometer P8, may be coupled to linkage 39 to provide an air density output signal of desired type.

Temperature transducer 30, as shown in FIG. 2, comprises a plurality of temperature responsive resistive elements, shown for illustration as the two elements R5 and R6, which are typically pure nickel temperature bulbs of conventional form. Elements R5 and R6 are mounted in a suitable housing 86 exposed to ram air in a manner corresponding to the usual mounting of a single temperature bulb. They are connected with other passive impedance elements, represented by the resistances R3 and R4, to form an electrical network of any desired configuration. That network is supplied with the reference voltage E via the line 84. In the preferred network shown, resistances R3 and R5 may be considered to form a voltage divider for the reference voltage, with R4 and R6 series connected in shunt to R5 and forming a voltage divider for the voltage signal developed at the junction of R3 and R5. The output on line 32 is taken from the junction of R4 and R6.

We have discovered that use of a plurality of temperature bulbs connected in a suitable passive network, of which that shown is illustrative, permits two specific short-comings of previous temperature transducers to be simultaneously corrected. Moreover, that is accomplished without reliance upon active elements, such, for example, as amplifying circuits or additional servo loops.

The temperature response of conventional resistive elements with positive temperature coefficient, such as pure nickel, is typically not as large as is desirable, particularly for the present computing system. Moreover, the resistance of such elements increases a little faster than linearly with temperature, approximately in accordance with the formula $$R(T) = R_0 + AT + BT^2 \tag{7}$$

The present invention provides improved overall response that differs typically from the form (7) both by making the coefficient B substantially zero, so that the response is essentially linear; and by simultaneously increasing the value of the coefficient A. By suitable selection of component values, the value of A may be increased by nearly a factor of two if linearity of response is not required. For the present purpose it is preferred to make the response linear and accept a smaller increase in slope. That may typically be done by selecting the values of R3 and R4 substantially equal to 0.37 and 2.7, respectively, times the average value of R5 and R6 over the temperature range of operation. For example, if the resistance of temperature elements R5 and R6 varies from 68 to 94 ohms over the operating temperature range, excellent performance is obtained with R3 and R4 equal to approximately 30 ohms and 300 ohms, respectively.

In operation of the illustrative system of FIG. 2, the voltage on line 18 represents the product of $P_{st}$ by the correction factor defined by Equation 3. That correction factor may be considered as the ratio of two correction factors, one representing the correction needed to convert indicated static pressure to true static pressure, and the other representing the correction needed to convert indicated, or bulb temperature to true air temperature. By introducing both of those correction elements at the same component, namely the winding of potentiometer P5, the single servo loop containing amplifier A1 can operate directly on the uncorrected indicated temperature signal on line 32. Yet the output transducer P8, typically driven directly from that loop, represents a value of computed air density that is based on corrected temperature as well as corrected static pressure.

We claim:

1. A system responsive to the true air density surrounding a moving aircraft or the like, said system comprising the combination of means for developing a temperature voltage that represents indicated air temperature, means for developing a static pressure voltage that represents indicated static pressure, means acting to develop from one of said voltages a corrected voltage proportional to said one voltage multiplied by a first correction factor and divided by a second correction factor, said first correction factor being proportional to the ratio of the true value to the indicated value of the variable corresponding to said one voltage, and said second correction factor being proportional to the ratio of the true value to the indicated value of the variable corresponding to the other voltage, and means responsive to said corrected voltage and said other voltage for developing an output signal that is proportional to the quotient of one of those two voltages by the other and that represents the true air density.

2. A system responsive to the true air density surrounding a moving aircraft or the like, said system comprising the combination of means for developing a first electrical voltage proportional to the indicated air temperature, a balance potentiometer having a movable tap, means supplying the first voltage as reference voltage to the balance potentiometer, means for developing a second electrical voltage proportional to the indicated static pressure, means acting to develop a corrected voltage proportional to the product of the second voltage by a variable correction factor, means responsive to the existing value of Mach number and acting to maintain the correction factor proportional to the ratio of true static pressure to indicated static pressure divided by the ratio of the true air temperature to the indicated air temperature, servo means for driving the balance potentiometer to maintain the voltage tapped therefrom equal to said corrected voltage, and output means driven by said servo means and representing true air density.

3. A system as defined in claim 1, and wherein said means for developing a corrected voltage comprise means for developing a signal proportional to Mach number, nonlinear voltage dividing means shaped in accordance with the dependence upon Mach number of the ratio of said first and second correction factors, means for supplying said one voltage as input voltage to the voltage dividing means, and means for driving the voltage dividing means under control of the Mach number signal.

References Cited by the Examiner

UNITED STATES PATENTS

| | | | |
|---|---|---|---|
| 2,567,756 | 9/51 | Amsler | 73—362 |
| 2,612,047 | 9/52 | Nilsson et al. | 73—362 |
| 2,739,477 | 3/56 | Vine | 73—178 |
| 2,751,786 | 6/56 | Coulbourn et al. | 73—182 |
| 2,869,367 | 1/59 | Moore. | |
| 2,944,736 | 7/60 | Ehns et al. | 235—151 |
| 2,985,012 | 5/61 | Wail | 73—178 |

FOREIGN PATENTS 595,910  4/60  Canada.

ISAAC LISANN, *Primary Examiner.*